United States Patent
Hogendoorn et al.

(10) Patent No.: US 12,535,347 B2
(45) Date of Patent: Jan. 27, 2026

(54) FLOWMETER AND METHOD FOR OPERATING SAME

(71) Applicant: KROHNE AG, Basel (CH)

(72) Inventors: Cornelis Johannes Hogendoorn, Spijk (NL); Michael Vogt, Bochum (DE); Yves Janssens, Arnhem (NL)

(*) Notice: Subject to any disclaimer, the term of this patent is extended or adjusted under 35 U.S.C. 154(b) by 400 days.

(21) Appl. No.: 18/182,779

(22) Filed: Mar. 13, 2023

(65) Prior Publication Data
US 2023/0304841 A1 Sep. 28, 2023

(30) Foreign Application Priority Data
Mar. 11, 2022 (DE) ............ 10 2022 105 759.3

(51) Int. Cl.
| | |
|---|---|
| G01F 1/667 | (2022.01) |
| G01F 1/66 | (2022.01) |
| G01F 1/663 | (2022.01) |

(52) U.S. Cl.
CPC ............ *G01F 1/667* (2013.01); *G01F 1/662* (2013.01); *G01F 1/663* (2013.01)

(58) Field of Classification Search
CPC .......... G01F 1/667; G01F 1/662; G01F 1/663
USPC ...................................... 73/861.28
See application file for complete search history.

(56) References Cited

U.S. PATENT DOCUMENTS

| | | |
|---|---|---|
| 4,947,683 A | 8/1990 | Minear et al. |
| 8,694,270 B2 | 4/2014 | Huang et al. |
| 2016/0041286 A1 | 2/2016 | Sinha |
| 2016/0341587 A1* | 11/2016 | Huang ............... G01F 1/56 |
| 2019/0032477 A1 | 1/2019 | Huang |

FOREIGN PATENT DOCUMENTS

| | | | |
|---|---|---|---|
| CN | 104155471 A | 11/2014 | |
| CN | 109188016 A | 1/2019 | |
| DE | 3230631 A1 | 2/1984 | |
| DE | 10205545 A1 * | 6/2003 | ............ G01F 1/662 |

OTHER PUBLICATIONS

Translation of DE-10205545-A1 (Year: 2003).*

* cited by examiner

*Primary Examiner* — Nathaniel T Woodward
(74) *Attorney, Agent, or Firm* — Patrick D. Duplessis

(57) ABSTRACT

A flowmeter for a multi-phase medium includes an ultrasonic transducer, a permittivity sensor, and a controller. The ultrasonic transducer converts electrical transmitting signals into ultrasonic transmitting signals, radiates them into the measurement volume, receives reflected ultrasonic receiving signals from the measurement volume, and converts the ultrasonic receiving signals into electrical receiving signals. The controller determines a reflection energy of the ultrasonic receiving signals from the measurement volume using the electrical receiving signals and distinguishes between, on the one hand, the water and the oil and, on the other hand, the gas in the measurement volume using the reflection energy. The controller determines a permittivity of the medium in the measurement volume using the permittivity sensor and distinguishes between, on the one hand, the water and, on the other hand, the oil and the gas in the measurement volume using the permittivity.

19 Claims, 3 Drawing Sheets

FLOWMETER AND METHOD FOR OPERATING SAME

TECHNICAL FIELD

In one aspect, the invention relates to a flowmeter for a medium having the phases water, oil and gas. In another aspect, the invention relates to a method for operating a flowmeter for a medium having the phases water, oil and gas.

BACKGROUND

A known flowmeter has an ultrasonic transducer for immersion in a measuring volume of the medium and a controller. The ultrasonic transducer is designed, on the one hand, for converting electrical transmitting signals into ultrasonic transmitting signals and radiating the ultrasonic transmitting signals into the measurement volume and, on the other hand, for receiving ultrasonic receiving signals from the measurement volume and converting the ultrasonic receiving signals into electrical receiving signals. Accordingly, the ultrasonic transducer is an electromechanical transducer.

The controller is designed to generate the electrical transmitting signals and to determine a velocity of the medium in the measurement volume using the electrical receiving signals. The controller and the ultrasonic transducer are electrically connected to transmit the electrical transmitting signals and the electrical receiving signals.

Usually, the flowmeter has a measuring tube on which the ultrasonic transducer is arranged. During operation of the flowmeter, the medium flows through the measuring tube and the ultrasonic transducer is immersed in the medium.

A known method for operating flowmeters comprises the following steps:

Electrical transmitting signals are generated by the controller, and the electrical transmitting signals are converted into ultrasonic transmitting signals by the ultrasonic transducer and radiated into the measurement volume.

Ultrasonic receiving signals from the measurement volume are received by the ultrasonic transducer and converted into electrical receiving signals. The controller uses the electrical receive signals to determine a velocity of the medium in the measuring volume.

The medium has the phases water, oil and gas. Usually the phases are separated from each other, even if the medium is flowing. Often the oil and gas phases are bubbles in the water phase.

The described flowmeter and method known from the prior art for operating a flowmeter determine only the velocity of the medium in the measurement volume. The object of the present invention is to provide a flowmeter and a method for operating a flowmeter, in which further properties of the medium in the measuring volume are determined.

SUMMARY

The object is achieved by a flowmeter having the disclosed features.

The flowmeter is characterized in that the controller is designed to determine a reflection energy of ultrasonic receiving signals from the measurement volume using the electrical receiving signals and to distinguish between, on the one hand, the water and the oil and, on the other hand, the gas in the measurement volume using the reflection energy.

Further, the flowmeter has a permittivity sensor for immersion in the measurement volume. The controller is designed to determine a permittivity of the medium in the measurement volume using the permittivity sensor and to distinguish between, on the one hand, the water and, on the other hand, the oil and the gas in the measurement volume using the permittivity.

During operation of the flowmeter, the ultrasonic transducer and the permittivity sensor are immersed in the measuring volume of the medium. The controller generates the electrical transmitting signals. The ultrasonic transducer converts the electrical transmitting signals into the ultrasonic transmitting signals and radiates them into the measurement volume. The ultrasonic transducer also receives the ultrasonic receiving signals from the measurement volume and converts them into the electrical receiving signals. Using the electrical receiving signals, the controller determines the velocity of the medium in the measurement volume. Further, the controller determines the reflection energy of the ultrasonic receiving signals from the measurement volume using the electrical receiving signals and distinguishes between the water and oil on the one hand and the gas in the measurement volume on the other hand using the reflection energy.

An ultrasonic transmission signal is reflected in the measurement volume at a boundary layer between two phases if these phases have different acoustic impedances. The acoustic impedance of a phase depends on a density of the phase. Thus, phases with different densities are distinguishable. The water and oil phases are particularly easy to distinguish from the gas phase, since their densities differ significantly. The reflected ultrasonic transmitting signal is the ultrasonic receiving signal. An ultrasonic receiving signal is thus generated by a reflection of an ultrasonic transmitting signal at a boundary layer of two phases with different densities. A reflection energy of an ultrasonic receiving signal depends on the difference of acoustic impedances of the phases forming a boundary layer. A boundary layer between one of the two liquid phases water and oil and the gaseous phase gas causes a significantly higher reflection energy than a boundary layer between one of the two liquid phases and the other liquid phase. Thus, a density of a phase can be determined from the reflection energy.

In addition, the controller determines the permittivity of the medium in the measuring volume using the permittivity sensor and distinguishes between the water on the one hand and the oil and gas in the measuring volume on the other hand using the permittivity. The controller is designed to generate and evaluate electrical measuring signals to determine the permittivity of the medium. The controller and the permittivity sensor are electrically connected to transmit the electrical measuring signals. The permittivity of water is significantly greater than the permittivities of oil and gas. This means that the water phase can be distinguished particularly well from the oil and gas phases.

In addition to the velocity of the medium in the measuring volume, the flowmeter also determines the reflection energy and the permittivity of the medium in the measuring volume. The measuring volume is the volume of the medium in which, on the one hand, there is a boundary layer between two phases of the medium and, on the other hand, the permittivity of the medium is determined.

This reflection energy and this permittivity allow to determine a phase of the medium in the measuring volume. The phase of the medium is water if the reflection energy is small and the permittivity is large. The phase is oil, if the reflection energy is small and also the permittivity is small. The phase is gas when the reflection energy is large and the permittivity is small. In the present context, the terms "small" and "large" used to evaluate reflection energy and permittivity should be understood relatively in the sense that, for example, the reflection energy of water is small compared to that of gas.

As a result, the flowmeter is designed to determine the velocity of a phase and the phase in the measurement volume, i.e., whether it is water, oil, or gas.

In one design of the flowmeter, the ultrasonic transducer is a piezo ultrasonic transducer.

In one design, the ultrasonic transducer has an acoustic waveguide in the measurement volume. The waveguide includes a window designed to, first, radiate the ultrasonic transmitting signals and, second, receive the ultrasonic receiving signals. During operation of the flowmeter, the window emits the ultrasonic transmitting signals and receives the ultrasonic receiving signals. At least the window is in the measurement volume.

There are various ways in which the waveguide can be configured.

In one design, the waveguide has a size in the range of Kolmogorov structures. Kolmogorov structures are the smallest flow vortices in a medium. In these, inertial and viscous forces are in equilibrium on the length scale. This size of the waveguide allows the velocity and phase of the medium to be determined in particularly small measurement volumes.

In another design, the waveguide has a diameter of approximately 1 mm. The waveguide preferably has the diameter in the range of the window. A diameter of this size also makes it possible to determine the velocity and the phase in particularly small measurement volumes.

In a further design, the waveguide has an acoustic impedance in the range of an acoustic impedance of water and oil. This results in only low reflection of the ultrasonic transmitting signals and ultrasonic receiving signals at the transition from the window to the water and oil.

In another design, the permittivity sensor is located on the waveguide in the measurement volume. Preferably, the permittivity sensor is arranged in a region of the window. This ensures that the reflection energy and the permittivity of the medium can be determined in as small a measuring volume as possible.

In another design, the permittivity sensor is arranged on the ultrasonic transducer in the measurement volume.

In a further design, the permittivity sensor comprises a capacitor having at least one first electrode and at least one second electrode in the measurement volume. Accordingly, during operation of the flowmeter, the capacitor is formed by the at least one first electrode, the at least one second electrode, and the medium as a dielectric between the two electrodes. The controller is designed to determine a capacitance of the capacitor and to determine the permittivity of the medium in the measurement volume using the capacitance and a geometry of the capacitor. Preferably, the at least two electrodes, i.e., the at least one first electrode and the at least one second electrode, and the medium form a plate capacitor with an area A and a distance d, so that the permittivity $\varepsilon$ can be determined from the capacitance C according to $\varepsilon = C \cdot d/A$. Accordingly, the at least two electrodes are parallel to each other. In a further design, the at least two electrodes are arranged coplanar with one another. This arrangement of the electrodes is particularly advantageous if measurements are to be carried out close to a surface of the ultrasonic transducer. A combination of parallel and coplanar electrodes is also possible. In an alternative design, the capacitor has at least two first electrodes and at least two second electrodes.

In a further embodiment of the above design, the at least one first electrode and the at least one second electrode have a spacing between 0.2 mm and 3 mm, preferably between 0.5 mm and 1 mm. Preferably, the spacing correlates with a size of the Kolmogorov structures.

The object is also achieved by a method for operating a flowmeter having the disclosed features.

The flowmeter carrying out the method additionally comprises a permittivity sensor, which is also immersed in the measurement volume of the medium.

The method described above is supplemented by the following steps:

The controller determines a reflection energy from the ultrasonic receiving signals out of the measurement volume using the electrical receiving signals and makes a distinction between, on the one hand, the water and the oil and, on the other hand, the gas in the measurement volume using the reflection energy.

The controller further determines a permittivity of the medium In the measurement volume using the permittivity sensor and makes a distinction between, on the one hand, the water and, on the other hand, the oil and gas in the measurement volume using the permittivity.

In one design of the method, the velocity is determined by the controller according to a Doppler effect.

In another design, the controller is first given a reflection boundary energy and then the controller assigns a reflection energy less than the reflection boundary energy to the oil and the water and a reflection energy greater than the reflection boundary energy to the gas in the measurement volume.

In one design, a permittivity limit is first specified to the controller and then a permittivity less than the permittivity limit is assigned by the controller to the oil and gas and a permittivity greater than the permittivity limit is assigned to the water in the measurement volume.

In a further design, the flowmeter carrying out the method is designed according to one of the previously described designs and further developments.

In all other respects, the explanations regarding the flowmeter apply accordingly to the method for operating a flowmeter and vice versa.

BRIEF DESCRIPTION OF THE DRAWINGS

In detail, there is a plurality of possibilities for designing and further developing the flowmeter and the method. For this, reference is made to the following description of preferred embodiments in conjunction with the drawings.

DETAILED DESCRIPTION

Figure 1:
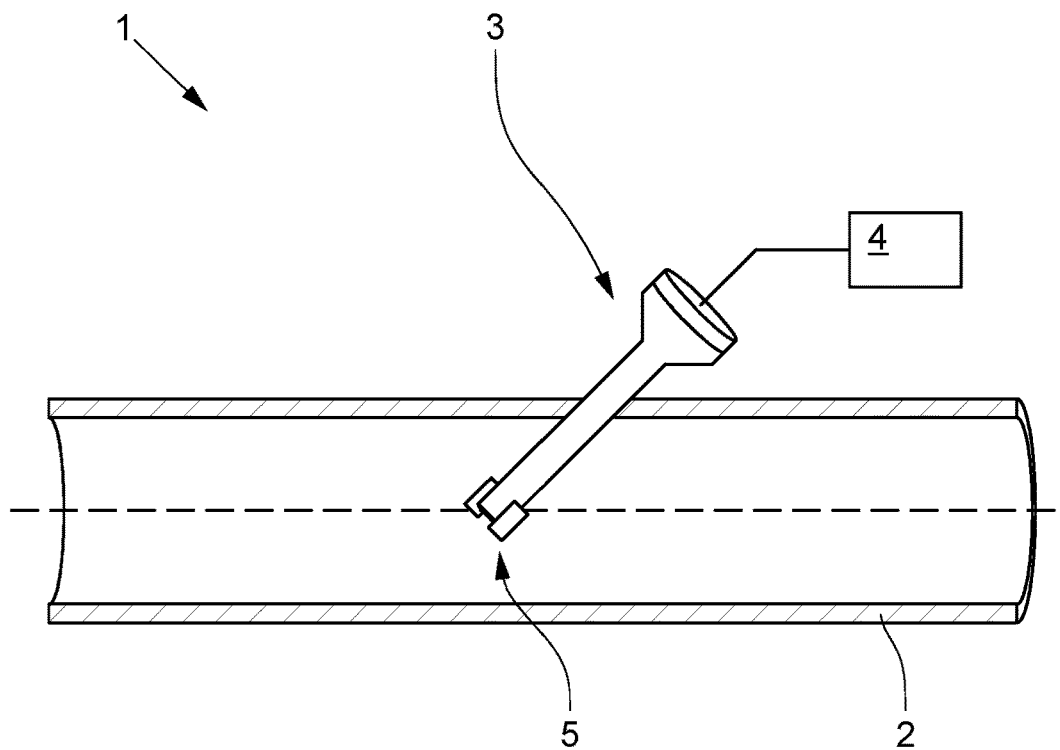
FIG. 1 illustrates an embodiment of a flowmeter with an ultrasonic transducer and a permittivity sensor.
Figure 2:
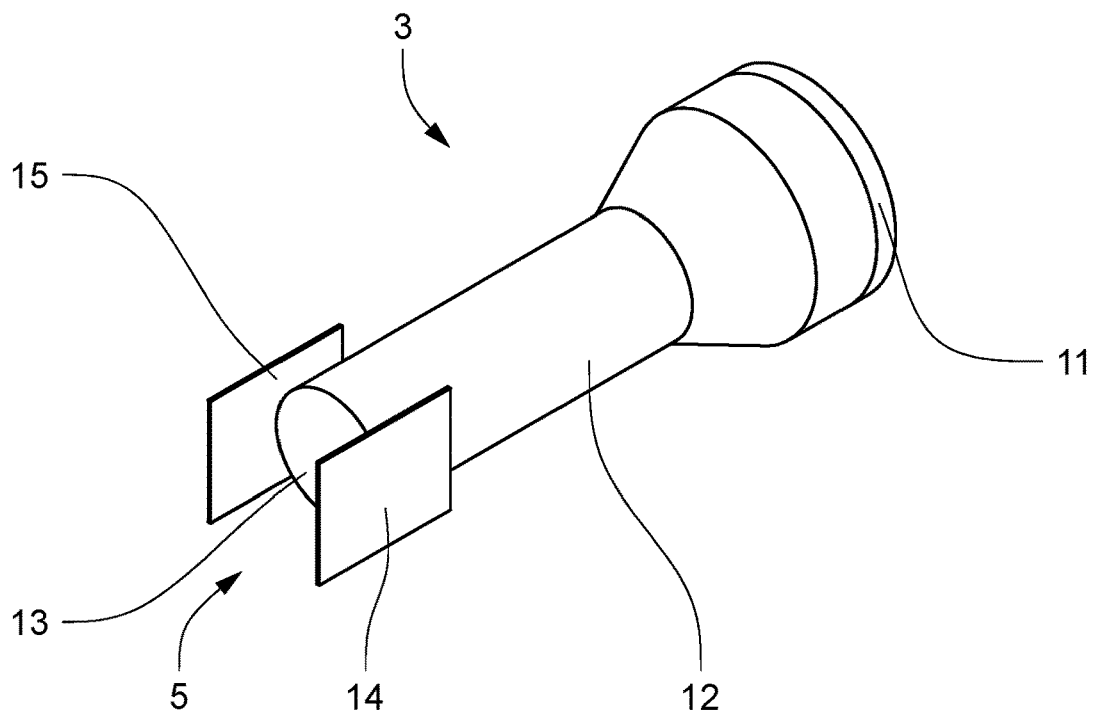
FIG. 2 illustrates the ultrasonic transducer and the permittivity sensor separately from the flowmeter.

FIG. 1 shows essential features of a flowmeter 1 in an abstracted representation. The flowmeter 1 has a measuring tube 2, an ultrasonic transducer 3, a controller 4 and a permittivity sensor 5. FIG. 2 shows essential features of the ultrasonic transducer 3 and the permittivity sensor 5 in a separate abstracted illustration. The measuring tube 2 has an opening through which the ultrasonic transducer 3 and and the permittivity sensor 5 protrude into an interior of the measuring tube 2. During operation of the flowmeter 1, a medium 6 with the phases water 7, oil 8 and gas 9 is made to flow through the measuring tube 2, see FIG. 3a. Then the ultrasonic transducer 3 and the permittivity sensor 5 are immersed in a measurement volume 10 of the medium 6. Thus, the ultrasonic transducer 3 and the permittivity sensor 5 are designed to be immersed in the measurement volume 10.

In this embodiment, the ultrasonic transducer 3 is a piezoelectric ultrasonic transducer. This has a PZT ceramic 11 on the one hand as an actuator for converting electrical transmitting signals into ultrasonic transmitting signals and on the other hand as a sensor for converting ultrasonic receiving signals into electrical receiving signals. Further, the ultrasonic transducer 3 has an acoustic waveguide 12. In the present embodiment, the waveguide 12 is substantially a circular cylinder having a first base surface and a second base surface. The first base surface is coupled to the PZT ceramic 11 such that ultrasonic transmitting signals are coupled from the PZT ceramic 11 into the waveguide 12, and ultrasonic receiving signals are transmitted from the waveguide 12 to the PZT ceramic 11. The second base surface has a window 13 through which the ultrasonic transmitting signals are radiated into the measurement volume 10 and the ultrasonic receiving signals are received from the measurement volume 10. The waveguide 12 has a diameter of 1 mm and an acoustic impedance in the range of an acoustic impedance of the water 7 and the oil 8.

Thus, the ultrasonic transducer 3 is designed, on the one hand, for converting the electrical transmitting signals into the ultrasonic transmitting signals and radiating the ultrasonic transmitting signals into the measurement volume 10 and, on the other hand, for receiving the ultrasonic receiving signals from the measurement volume 10 and converting the ultrasonic receiving signals into the electrical receiving signals.

The controller 4 is designed to generate the electrical transmitting signals and to determine a velocity of the medium 6 in the measurement volume 10 using the electrical receiving signals. The controller 4 and the ultrasonic transducer 3 are electrically connected to each other for transmitting the electrical transmitting signals and the electrical receiving signals.

Figure 3:
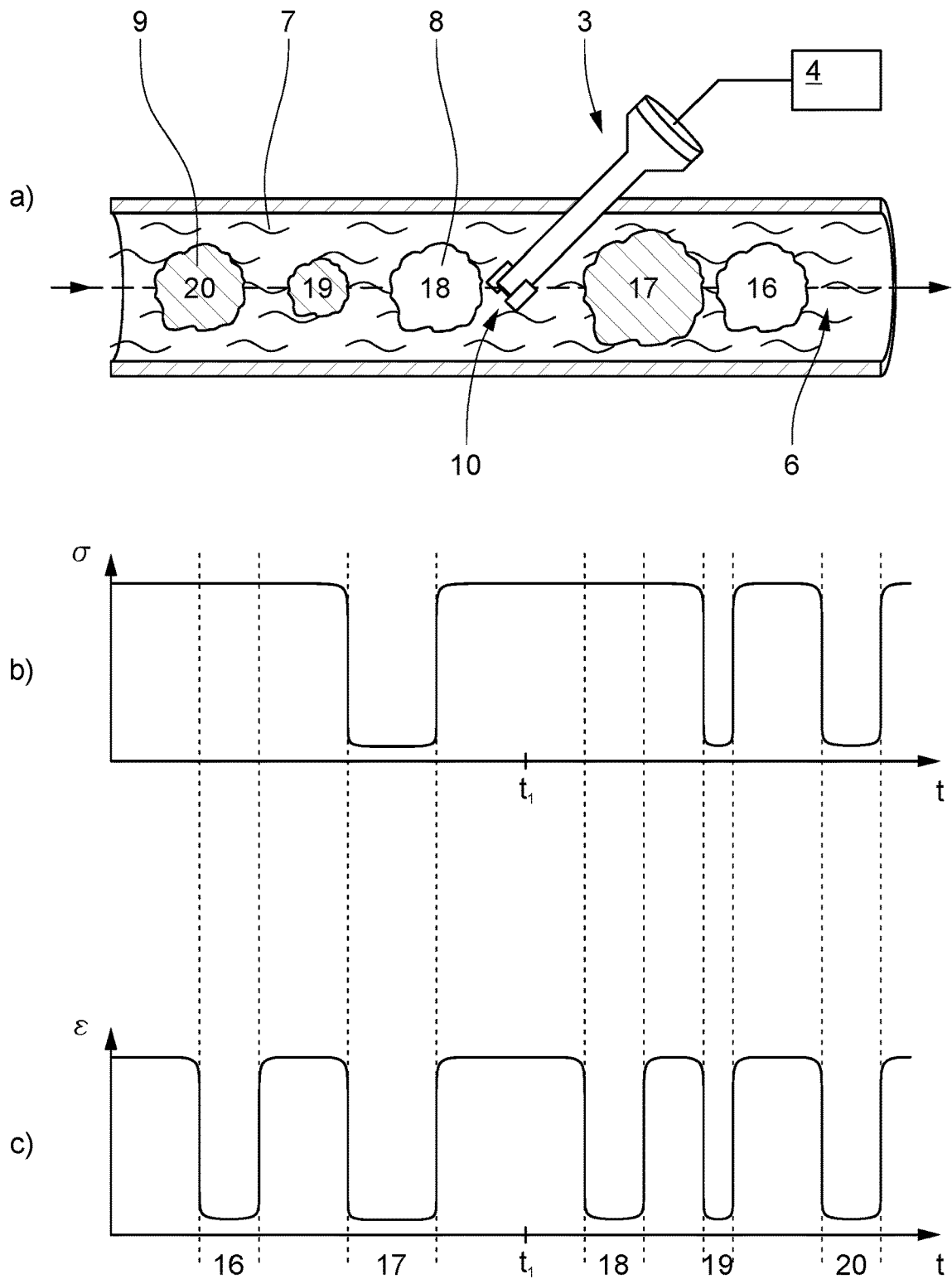
FIG. 3a illustrates the flowmeter during operation.
FIG. 3b illustrates a density versus time determined by the flowmeter.
FIG. 3c illustrates a permittivity versus time determined by the flowmeter.

Further, the controller 4 is designed to determine a reflection energy from the ultrasonic receiving signals from the measurement volume 10 using the electrical receiving signals and to distinguish between, on the one hand, the water 7 and the oil 8 and, on the other hand, the gas 9 in the measurement volume 10 using the reflection energy. For this, the controller 4 is also designed to determine a density σ of the medium 6 in the measurement volume 10 from the reflection energy. The density σ determined by the controller 4 during operation of the flowmeter 1 over time t is shown in FIG. 3b.

The permittivity sensor 5 is arranged on the waveguide 12 in the immediate vicinity of the window 13. In the present embodiment, the permittivity sensor 5 is a capacitor having a first electrode 14 and a second electrode 15. The two electrodes form a plate capacitor, wherein the first electrode 14 and the second electrode 15 are spaced apart by 1 mm.

The controller 4 is designed for determining a permittivity ε of the medium 6 in the measurement volume 10 using the permittivity sensor 5 and for distinguishing between, on the one hand, the water 7 and, on the other hand, the oil 8 and the gas 9 in the measurement volume 10 using the permittivity 8. The controller 4 is designed for generating and evaluating electrical measuring signals for determining the permittivity ε of the medium 6. The controller 4 and the permittivity sensor 5 are electrically connected to each other for transmitting the electrical measuring signals. The permittivity ε determined by the controller 4 over time during operation of the flowmeter 1 is shown in FIG. 3c.

Since the diameter of the waveguide 12 is only 1 mm and the distance between the two electrodes 14, 15 is only 1 mm, the waveguide 12 and the permittivity sensor 5 have a size in the range of Kolmogorov structures, which is why individual phases of the medium 6 can be measured.

As has already been explained, FIG. 3a shows the flowmeter 1 during operation, wherein the medium 6 with the phases water 7, oil 8 and gas 9 is made to flow through the measuring tube 2 in the direction of the arrow. Namely, the flowmeter 1 is shown at a time t1. At this time, there are five bubbles in the water 7 phase, namely a first bubble 16, a second bubble 17, a third bubble 18, a fourth bubble 19, and a fifth bubble 20. The first bubble 17 and the third bubble 18 are formed by the oil 8, and the second bubble 17, the fourth bubble 19, and the fifth bubble 20 are formed by the gas 9.

Figure 4:
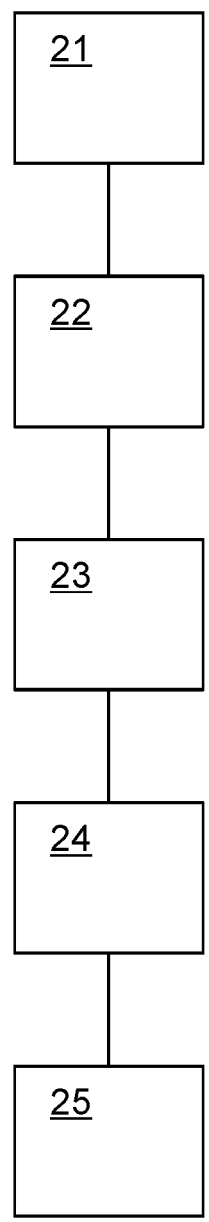
FIG. 4 illustrates a flow chart of a method.

The flowmeter 1 carries out a method comprising the method steps shown in FIG. 4.

In a first method step 21, the controller 4 generates electrical transmitting signals which the ultrasonic transducer 3 converts into ultrasonic transmitting signals and emits into the measurement volume 10 of the medium 6.

In a second method step 22, the ultrasonic transducer 3 receives ultrasonic receiving signals from the measurement volume 10 and converts them into electrical receiving signals. A velocity of the medium 7 in the measurement volume 6 is determined by the controller 4 using the electrical receiving signals.

In a third method step 23, the controller 4 uses the electrical receiving signals to determine a reflection energy of the ultrasonic receiving signals from the measurement volume 10 and uses this to determine a density σ of the medium 6 in the measurement volume 10. Using the density σ, the controller 4 then differentiates between the water 7 and the oil 8 on the one hand and the gas 9 in the measurement volume 10 on the other. FIG. 3b shows the course of the determined density σ over time t.

In a fourth method step 24, the controller 4 determines a permittivity ε of the medium 6 in the measurement volume 10 using the permittivity sensor 5 and distinguishes between, on the one hand, the water 7 and, on the other hand, the oil 8 and the gas 9 in the measurement volume 10 using the permittivity ε. FIG. 3c shows the course of the determined permittivity ε over time t.

In a fifth method step 25, a phase of the medium 6 in the measurement volume 10 is determined by the controller according to the following criteria.

The phase of the medium is water if the density σ is large and the permittivity ε is large. The phase is oil if the density σ is large and also the permittivity ε is small. The phase is gas if the density σ is small and the permittivity ε is small. In the present context, the terms "small" and "large" used to evaluate the density σ and permittivity ε are relative in the sense that, for example, the density σ of water is large compared to that of gas.

Thus, for example, the controller arrives at the following results. During the period in which the first bubble 16 is in the measurement volume 10, the permittivity ε is small and the density σ is high. Accordingly, there is oil 8 in the measurement volume 10. In the period in which the second bubble is in the measurement volume 10, the permittivity ε is small and the density σ is small. Accordingly, in the measurement volume 10 there is gas 9. In the periods when none of the bubbles is in the measurement volume 10, the permittivity ε is large and the density σ is large. Accordingly, water 7 is in the measurement volume 10.

The invention claimed is:

1. A flowmeter for a medium with the phases water, oil and gas, the flowmeter comprising:
    an ultrasonic transducer for immersion in a measuring volume of the medium;
    a controller; and
    a permittivity sensor for immersion in the measuring volume;
    wherein the ultrasonic transducer is designed, on the one hand, for converting electrical transmitting signals into ultrasonic transmitting signals and radiating the ultrasonic transmitting signals into the measuring volume and, on the other hand, for receiving reflected ultrasonic receiving signals from the measuring volume and for converting the ultrasonic receiving signals into electrical receiving signals;
    wherein the controller is designed for generating the electrical transmitting signals and for determining a velocity of the medium in the measuring volume using the electrical receiving signals;
    wherein the controller is designed for determining a reflection energy of the ultrasonic receiving signals from the measuring volume using the electrical receiving signals and for distinguishing between, on the one hand, the water and the oil and, on the other hand, the gas in the measuring volume using the reflection energy; and
    wherein the controller is designed for determining a permittivity of the medium in the measuring volume using the permittivity sensor and for distinguishing between, on the one hand, the water and, on the other hand, the oil and the gas in the measuring volume using the permittivity.

2. The flowmeter according to claim 1, wherein the ultrasonic transducer is a piezoelectric ultrasonic transducer.

3. The flowmeter according to claim 1, wherein the ultrasonic transducer has an acoustic waveguide in the measuring volume.

4. The flowmeter according to claim 3, wherein the waveguide has a size in the range of Kolmogorov structures.

5. The flowmeter according to claim 3, wherein the waveguide has a diameter of about 1 mm.

6. The flowmeter according to claim 3, wherein the waveguide has an acoustic impedance in the range of an acoustic impedance of water and oil.

7. The flowmeter according to claim 3, wherein the permittivity sensor is arranged on the waveguide in the measuring volume.

8. The flowmeter according to claim 1, wherein the permittivity sensor is arranged on the ultrasonic transducer in the measuring volume.

9. The flowmeter according to claim 1, wherein the permittivity sensor includes a capacitor with at least one first electrode and at least one second electrode in the measuring volume; and
    wherein the controller is designed for determining a capacitance of the capacitor and for determining the permittivity of the medium in the measuring volume using the capacitance and a geometry of the capacitor.

10. The flowmeter according to claim 9, wherein the at least one first electrode and the at least one second electrode have are spaced apart by a distance having a magnitude between 0.2 mm and 3 mm.

11. A method for operating a flowmeter for a medium with the phases water, oil and gas, wherein the flowmeter includes an ultrasonic transducer, a controller and a permittivity sensor, wherein the ultrasonic transducer and the permittivity sensor are immersed in a measuring volume of the medium, the method comprising:
    generating electrical transmitting signals by the controller;
    converting the electrical transmitting signals into ultrasonic transmitting signals by the ultrasonic transducer;
    radiating the ultrasonic transmitting signals into the measuring volume;
    receiving, by the ultrasonic transducer, reflected ultrasonic receiving signals from the measuring volume;
    converting, by the ultrasonic transducer, the reflected ultrasonic receiving signals into electrical receiving signals;
    determining a velocity of the medium in the measuring volume by the controller using the electrical receiving signals;
    determining, by the controller, a reflection energy of the ultrasonic receiving signals from the measuring volume using the electrical receiving signals and making a distinction between the water and the oil on the one hand and the gas in the measuring volume on the other hand using the reflection energy; and
    determining, by the controller, a permittivity of the medium in the measuring volume using the permittivity sensor and making a distinction between, on the one hand, the water and, on the other hand, the oil and the gas in the measuring volume using the permittivity.

12. The method according to claim 11, wherein the velocity is determined by the controller according to a Doppler effect.

13. The method according to claim 11, wherein a reflection limit energy is provided to the controller and a reflection energy smaller than the reflection limit energy is assigned to the oil and the water and a reflection energy larger than the reflection limit energy is assigned to the gas by the controller.

14. The method according to claim 11, wherein a permittivity limit is provided to the controller and a permittivity smaller than the permittivity limit is assigned to the oil and the gas and a permittivity larger than the permittivity limit is assigned to the water by the controller.

15. A method for distinguishing between phases of a multi-phase medium, comprising:
    radiating electrical transmitting signals into a measuring volume of the medium;
    receiving reflected ultrasonic receiving signals from the measuring volume;
    converting the reflected ultrasonic receiving signals into electrical receiving signals;
    determining a reflection energy of the ultrasonic receiving signals using the electrical receiving signals;
    distinguishing between a water phase and an oil phase of the medium in the measuring volume, on the one hand, and a gas phase of the medium in the measuring volume, on the other hand, using the reflection energy;

determining a permittivity of the medium in the measuring volume; and distinguishing between the water phase of the medium in the measuring volume, on the one hand, and the oil phase and the gas phase of the medium in the measuring volume, on the other hand, using the permittivity.

16. The method according to claim 15, further comprising:

determining a velocity of the medium in the measuring volume using the electrical receiving signals.

17. The method according to claim 16, wherein the velocity is determined according to a Doppler effect.

18. The method according to claim 15, further comprising:

assigning a first reflection energy to the oil phase and the water phase of the medium in the measuring volume;

assigning a second reflection energy to the gas phase of the medium in the measuring volume; and wherein the first reflection energy is smaller than a reflection limit energy and the second reflection energy is larger than the reflection limit energy.

19. The method according to claim 15, further comprising:

assigning a first permittivity value to the oil phase and the water phase of the medium in the measuring volume;

assigning a second permittivity value to the gas phase of the medium in the measuring volume; and wherein the first permittivity value is smaller than a permittivity limit and the second permittivity value is larger than the permittivity limit.

* * * * *